United States Patent
Carrico et al.

(10) Patent No.: US 9,135,827 B1
(45) Date of Patent: Sep. 15, 2015

(54) SYSTEM, APPARATUS, AND METHOD FOR GENERATING AIRPORT SURFACE INCURSION ALERTS

(75) Inventors: Matthew J. Carrico, Mt. Vernon, IA (US); Felix B. Turcios, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 801 days.

(21) Appl. No.: 13/236,676

(22) Filed: Sep. 20, 2011

(51) Int. Cl.
| G06F 19/00 | (2011.01) |
| G08G 5/00 | (2006.01) |
| G08G 5/06 | (2006.01) |
| G08G 1/137 | (2006.01) |
| G01S 11/04 | (2006.01) |

(52) U.S. Cl.
CPC ............. *G08G 5/0026* (2013.01); *G01S 11/04* (2013.01); *G08G 1/137* (2013.01); *G08G 5/0047* (2013.01); *G08G 5/0082* (2013.01); *G08G 5/06* (2013.01); *G08G 5/065* (2013.01)

(58) Field of Classification Search
CPC .......... G01S 11/04; G08G 5/06; G08G 5/065; G08G 1/137; G08G 5/0047; G08G 5/0026; G08G 5/0082
USPC ................................................. 701/120, 301
See application file for complete search history.

(56) References Cited

U.S. PATENT DOCUMENTS

| 4,789,865 | A  | * | 12/1988 | Litchford ...................... 342/455 |
| 6,144,915 | A  | * | 11/2000 | Shiomi et al. ................. 701/120 |
| 6,606,563 | B2 |   | 8/2003  | Corcoran, III |
| 6,937,165 | B2 | * | 8/2005  | Rogers ........................... 340/963 |
| 7,068,211 | B2 | * | 6/2006  | Oswald et al. .................. 342/70 |
| 7,117,089 | B2 | * | 10/2006 | Khatwa et al. ................. 701/301 |
| 7,587,278 | B2 |   | 9/2009  | Poe et al. |
| 7,589,644 | B2 | * | 9/2009  | Meunier ........................ 340/945 |
| 7,739,047 | B2 | * | 6/2010  | Meunier et al. ............... 701/300 |
| 7,765,037 | B2 | * | 7/2010  | Bagge et al. ..................... 701/16 |
| 7,963,618 | B2 | * | 6/2011  | Stone et al. ..................... 301/16 |
| 7,965,223 | B1 | * | 6/2011  | McCusker ...................... 342/29 |
| 8,040,259 | B2 | * | 10/2011 | Glover ........................... 340/961 |
| 8,145,367 | B2 | * | 3/2012  | Khatwa et al. ................... 701/16 |
| 8,478,461 | B2 | * | 7/2013  | Khatwa et al. ................... 701/16 |
| 8,531,293 | B2 | * | 9/2013  | Putz .............................. 340/541 |
| 2003/0033084 | A1 | * | 2/2003 | Corcoran, III ............... 701/301 |
| 2005/0015202 | A1 | * | 1/2005 | Poe et al. ...................... 701/301 |
| 2005/0190079 | A1 | * | 9/2005 | He ................................ 340/945 |
| 2008/0106438 | A1 | * | 5/2008 | Clark et al. ................... 340/972 |

(Continued)

*Primary Examiner* — Russell Frejd
*Assistant Examiner* — Sze-Hon Kong
(74) *Attorney, Agent, or Firm* — Angel N. Gerdzhikov; Donna P. Suchy; Daniel M. Barbieri

(57) ABSTRACT

Present novel and non-trivial system, apparatus, and method for generating at least one airport surface incursion alert in a runway awareness and warning system are disclosed. A navigation data source and an airport surface data source provide navigation data and airport surface data to a surface alert generator ("SAG"). The SAG constructs a reference line based upon the airport surface data (e.g., landing threshold points, taxiway hold short lines, etc. . . . ), constructs a ground track line, determines at least one alert distance to an alert point along the ground track line if there is a reference line converging on and intersecting with the ground track line to form an alert point, and generates surface alert data if an alert time to the alert point meets an alert threshold time. The surface alert data is provided to a presentation system in which a visual alert, aural alert, and/or tactile alert is presented.

18 Claims, 6 Drawing Sheets

(56) References Cited

U.S. PATENT DOCUMENTS

| | | | |
|---|---|---|---|
| 2008/0140269 A1* | 6/2008 | Naimer et al. | 701/7 |
| 2008/0195301 A1* | 8/2008 | Fabre et al. | 701/120 |
| 2008/0275642 A1* | 11/2008 | Clark et al. | 701/208 |
| 2009/0115637 A1* | 5/2009 | Naimer et al. | 340/979 |
| 2010/0004800 A1* | 1/2010 | Zammit-Mangion et al. | 701/3 |
| 2010/0109936 A1* | 5/2010 | Levy | 342/30 |
| 2010/0114491 A1* | 5/2010 | Maily | 701/301 |
| 2011/0071750 A1* | 3/2011 | Giovino et al. | 701/120 |
| 2011/0184635 A1* | 7/2011 | Khatwa et al. | 701/120 |
| 2011/0231096 A1* | 9/2011 | Ridenour, II | 701/301 |
| 2013/0096814 A1* | 4/2013 | Louis et al. | 701/301 |

\* cited by examiner

SYSTEM, APPARATUS, AND METHOD FOR GENERATING AIRPORT SURFACE INCURSION ALERTS

BACKGROUND OF THE INVENTION

1. Field of the Invention

This invention pertains generally to the field of aircraft alerting systems that provide alerts to the pilot or flight crew of an aircraft.

2. Description of the Related Art

A runway incursion is an incident at an airport which adversely affects runway safety. Runway incursions are the most noticeable form of taxi navigation errors. Increased scrutiny by regulatory authorities has only heightened the awareness of the safety issues related to runway incursions. Taxi navigation errors cause many runway incursions and present potential collision hazards.

Airport complexity, approach patterns, airborne and surface traffic, and on-time departure/arrival pressures are some of the factors which can make flying a real challenge for today's pilots. Significant improvements in avionics technologies have helped to improve the aviation safety record. Despite many improvements, situational awareness of the runway environment still remains a significant safety issue Inventors have addressed the issue of runway incursion. For example, Corcoran III addresses the issue of runway incursion in U.S. Pat. No. 6,606,563 entitled "Incursion Alerting System." In Corcoran III, a system for alerting the occupant of a vehicle that the vehicle is approaching a zone of awareness, where the zone of awareness surrounds a runway and is based upon a reference such as a line or line segment that defines a runway centerline. When the vehicle is within a predetermined value of the zone of awareness, an alert is provided to the occupant. That is, a processor calculates the difference between the zone of awareness and the aircraft and initiates the alerting device if the distance is within predetermined parameters. The processor may also take into account the direction of travel and/or velocity when initiating the alert to adjust predetermined parameters by, for instance, increasing a fixed distance at which the alert is initiated if the vehicle is approaching the zone of awareness. Alternatively, the processor may adjust values corresponding to the location of the vehicle, location of the reference upon which the zone of awareness is based, or the distance between the vehicle location and reference location, according to the velocity, direction of travel, or both.

In another example, Roe et al discusses an on-ground Runway Awareness and Advisory System ("RAAS") in U.S. Pat. No. 7,587,278 entitled "Ground Operations and Advanced Runway Awareness and Advisory System." In Roe, the RAAS enhances situational awareness during taxiing by providing advisories to the pilot. The RAAS algorithm determines whether the aircraft will cross a runway or whether the aircraft is on the runway and provides applicable advisories. For landing and on-ground aircraft, the RAAS constructs an advisory annunciation envelope or bounding box from which situational awareness annunciations are announced. An Aural/Visual Advisory Processing function generates an advisory when a runway encounter is triggered when an aircraft enters the envelope surrounding the runway that could be augmented as a function of ground speed.

Airport complexity, approach patterns, airborne and surface traffic, and on-time departure/arrival pressures are some of the factors which can make flying a real challenge for today's pilots. Improvements in avionics technologies such as the incursion alerting system described in Corcoran III have helped to improve the aviation safety record. Despite many improvements, situational awareness of the runway environment still remains a significant safety issue.

BRIEF SUMMARY OF THE INVENTION

The embodiments disclosed herein present novel and non-trivial system, apparatus, and method for generating at least one airport surface incursion alert in a surface awareness and warning system.

In one embodiment, a system for generating at least one runway incursion alert is disclosed. The system may be comprised of a navigation data source, an airport surface data source, and a surface alert generator ("SAG") configured to perform the method disclosed below. The system may further include a presentation system configured to receive surface alert data generated by the SAG and comprised of a display unit, an aural alert unit, and/or a tactile alert unit and present an applicable alert to a pilot, where the surface alert represented in the surface alert data is presented to the pilot visually, aurally, and/or tactilely.

In another embodiment, an apparatus for generating at least one runway incursion alert is disclosed. The apparatus is the SAG configured to perform the method disclosed in the following paragraph. The apparatus could include input and output interfaces to facilitate the receiving of the navigation data and the airport surface data and providing of surface alert data to at least one user system such as the presentation system. The SAG and the input and output interfaces could be part of a printed circuit board.

In another embodiment, a method for generating at least one runway incursion alert is disclosed, where the method may be performed by the SAG. When configured to perform the method, the SAG may receive navigation data representative of at least ownship position, retrieve airport surface data based upon the navigation data, construct a reference line based upon the airport surface data, construct a ground track line based upon the navigation data, determine one or more alert distances to one or more alert points intersecting with one or more converging reference lines, and generate surface alert data if the alert time to an alert point is less than or equal to an alert threshold time based upon an alert distance and the navigation data.

The airport surface data could be representative of landing threshold points and/or taxiway hold short lines. Each alert distance could be determined as a function of the shortest distance between ownship and each converging reference line and a trigonometric function of an angle formed between the ground track line and the converging reference line. The surface alert data could be comprised of visual alert data, aural alert data, and/or tactile alert data. The visual alert data and/or aural alert data could be representative of a caution alert and/or a warning alert, respectively, where a caution alert threshold time could provide the basis for generating the caution alert and a warning alert threshold time could provide the basis for generating the warning alert.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
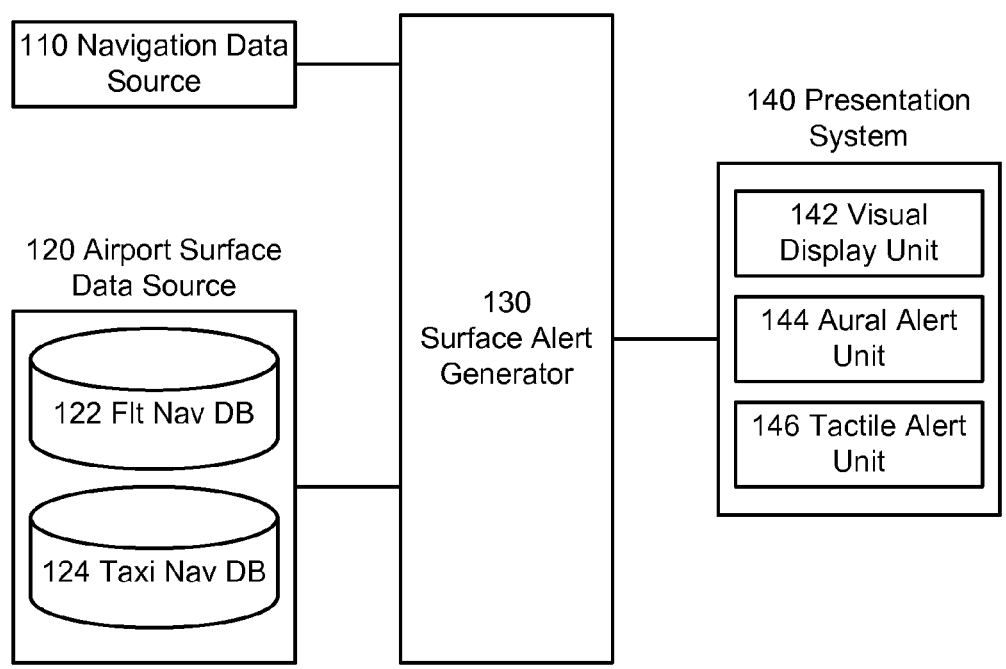
FIG. 1 depicts a block diagram of a runway awareness and warning system.

FIG. 1 depicts a block diagram of a surface awareness and warning system ("SAWS") 100 suitable for implementation of the techniques described herein. The SAWS 100 of an embodiment of FIG. 1 includes a navigation data source 110, an airport surface data source 120, a surface alert generator ("SAG") 130, and a presentation system 140.

In an embodiment of FIG. 1, the navigation data source 110 could be comprised of any source(s) which provides data representative of ownship information, where such information could be comprised of, but not limited to, horizontal position, vertical position, pressure altitude, horizontal velocity (e.g., ground speed), vertical velocity, horizontal position accuracy, vertical position accuracy, horizontal velocity accuracy, vertical velocity accuracy, ground track, and/or ownship intended flight path information. One navigation data source 110 for providing ownship information data could be a navigation system found in an aircraft. It should be noted that data, as embodied herein for any source or system in an aircraft including the navigation system, could be comprised of any analog or digital signal, either discrete or continuous, which could contain information. As embodied herein, data and signals are treated synonymously. Aircraft could mean any vehicle which is able to fly through the air or atmosphere including, but not limited to, lighter than air vehicles and heavier than air vehicles, wherein the latter may include fixed-wing and rotary-wing vehicles. Aircraft may also include any surface vehicles which operate on airport surfaces and could be equipped with the SAWA 100 disclosed herein.

The navigation system may include, but is not limited to, an air/data system, an attitude heading reference system, an inertial guidance system (or inertial reference system), a global navigation satellite system (or satellite navigation system), and/or a flight management system ("FMS") (which is comprised of, in part, a database), all of which are known to those skilled in the art. As embodied herein, the navigation data source 110 may provide ownship information data to the SAG 130 for subsequent processing as discussed herein.

In an embodiment of FIG. 1, the airport surface data source 120 could be comprised of any source(s) of airport surface reference data. The airport surface data source 120 may include, but is not limited to, a flight navigation database 122 that may be part of an FMS and/or a taxi navigation database 124. It should be noted that data contained in any database discussed herein may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Any database used in the embodiments disclosed herein may be a stand-alone database or a combination of databases.

The flight navigation database 122 may contain records which provide surface reference data such as, but not limited to, runway surface data such as at least one landing threshold point ("LTP"), runway direction and elevation data, airport data, and/or approach data. The flight navigation database 122 could be a database described in the following documents published by Aeronautical Radio, Incorporated ("ARINC"): ARINC Specification 424-18 entitled "Navigations Systems Data Base" ("ARINC 424"), an aviation industry standard known to those skilled in the art.

The taxi navigation database 124 may be used to store airport data that may be representative of, in part, airport surfaces. Airport surfaces include, but are not limited to, locations and information delineating or defining locations of runways, taxiways, and apron areas, fixed based operators ("FBOs"), terminals, and other airport facilities. The taxi navigation database 124 could comprise an aerodrome mapping database ("AMDB") as described in the following aviation industry standards published by both RICA, Incorporated and ARINC: RICA DO-272A entitled "User Requirements for Aerodrome Mapping Information" and ARINC Specification 816-1 entitled "Embedded Interchange Format for Airport Mapping Database" ("ARINC 816"). DO-272A provides for aerodrome surface mapping requirements for aeronautical uses on-board aircraft, and ARINC 816 defines an open encoding format for airport databases that may be loaded in aircraft systems. Those skilled in the art appreciate that aviation standards may be changed with future amendments or revisions, that additional content may be incorporated in future revisions, and/or that other standards related to the subject matter may be adopted. The embodiments disclosed herein are flexible enough to include such future changes and/or adoptions without affecting the content and/or structure of an AMDB and/or the encoding format. As embodied herein, the airport surface data source 120 may provide airport surface data to the SAG 130 for subsequent processing as discussed herein.

In an embodiment of FIG. 1, the SAG 130 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The SAG 130 may be driven by the execution of software or computer instruction code containing algorithms developed for the specific functions embodied herein. The SAG 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. The SAG 130 could be a processor(s) used by or in conjunction with any other system of the aircraft including, but not limited to, the navigation data source 110, the airport surface data source 120, and the presentation system 140, or any combination thereof.

The SAG 130 may be programmed or configured to receive as input data representative of information obtained from various systems and/or sources including, but not limited to, the navigation data source 110 and the airport surface data source 120. As embodied herein, the terms "programmed" and "configured" are synonymous. The SAG 130 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The SAG 130 may be programmed or configured to execute one or both of the methods discussed in detail below. The SAG 130 may be programmed or configured to provide a traffic symbology data set to various systems and/or units including, but not limited to, the presentation system 140.

The presentation system 140 could be comprised of a visual display unit 142, an aural alerting unit 144, and/or a tactile alerting unit 146 for presenting the pilot with surface situational awareness information. The display unit 142 could be, but is not limited to, a head-up display unit ("HUD"), a head-down display unit ("HDD"), a primary flight director, a navigation display, a tactical display unit, a strategic display unit, a multi-purpose control display unit, a multi-function display unit, a side display unit, and/or a data link control display unit. The HDD unit is typically a unit for providing flight information to the pilot that is mounted to an aircraft's flight instrument panel located in front of a pilot and below the windshield and the pilot's external field of vision. The HUD unit is mounted in front of the pilot at windshield level and is directly in the pilot's external field of vision. The HUD system is advantageous because the display is transparent allowing the pilot to keep his or her eyes "outside the cockpit" while the display unit provides flight information to the pilot.

The display unit 142 may include a vision system (not shown) which generates an image data set which represents the image displayed on the display unit 142. Vision systems could include, but are not limited to, a synthetic vision system ("SVS"), an enhanced vision system ("EVS"), and/or a combined SVS-EVS. The display unit 142 could be capable of presenting surface alert information. Alerts may be based on level of threat or conditions requiring immediate crew awareness. Caution alerts may be alerts requiring immediate crew awareness and subsequent flight crew response. Warning alerts may be alerts requiring immediate flight crew action. As embodied herein, both caution and warning alerts may be presented in combination with or simultaneous to aural alerts and/or tactile alerts. Alerts may be presented visually by depicting one or more colors that may be presented on the display unit 142 indicating one or more levels of threat. For the purpose of illustration and not limitation, amber or yellow may indicate a caution alert, and red may indicate a warning alert.

In one embodiment, visual alerts could be presented in a textual form including text messages such as a red "APPROACHING A RUNWAY" when a warning alert threshold time has been crossed and/or an amber "APPROACHING A RUNWAY" when a caution alert threshold time has been crossed. It should be noted that the preceding text messages are to be considered generic messages, knowing that a manufacturer and/or end-user have the ability to configure any message that they may determine is appropriate to convey the caution and/or warning messages. In another embodiment, visual alerts could be presented in a non-textual form such as a symbol. In another embodiment, textual and non-textual forms could remain steady or flash intermittently, where the speed of such flashing could depend on the time to the alert point as discussed in detail below.

The aural alerting unit 144 may be any unit capable of producing aural alerts. Aural alerts may be discrete sounds, tones, and/or verbal statements used to annunciate a condition, situation, or event. In one embodiment, an aural alert could call out "WARNING—APPROACHING A RUNWAY" when a warning alert threshold time has been crossed and/or "CAUTION—APPROACHING A RUNWAY" when a warning alert threshold time has been crossed. As embodied herein, warning and caution aural alerts could be presented in combination with or simultaneous to visual alerts and/or tactile alerts.

The tactile alerting unit 146 may be any unit capable of producing tactile alerts. Tactile alerts may be any tactile stimulus to present a condition, situation, or event to the pilot. As embodied herein, tactile alerts could be presented in combination with or simultaneous to visual alerts and/or aural alerts. As embodied herein, the presentation system 140 may be configured to receive surface alert data provided by the SAG 130.

The advantages and benefits of the embodiments discussed herein may be illustrated by showing how data representative of the reference points of an airport surface or feature may be retrieved and used to generate pilot advisories to improve a pilot's situational awareness of the surface environment of an airport in the prevention of runway incursions. The drawings of FIG. 2 illustrate an airport comprised of two runway surfaces (i.e., four runways) and two taxiway surfaces. Although the illustrations herein will be drawn to two runway surfaces and two taxiway surfaces, the disclosures presented herein may be applied to any airport having more or less surfaces. The two runway surfaces are Runways 14/32 (item 202) and Runways 7/25 (item 204), and the two taxiway surfaces are Taxiway A 206 and Taxiway B 208; the directions of Runways 14/32 are 140 degrees and 320 degrees, and the directions of Runways 7/25 are 070 degrees and 250 degrees. Taxiway A is parallel to Runways 14/32, and Taxiway B is parallel to Runways 7/25. Ownship 210 is located on Taxiway A and taxiing in a direction of 320 degrees (the same direction as Runway 32) towards the intersection of the two taxiways; that is, the ground track of ownship 210 is 320 degrees.

Figure 2A:
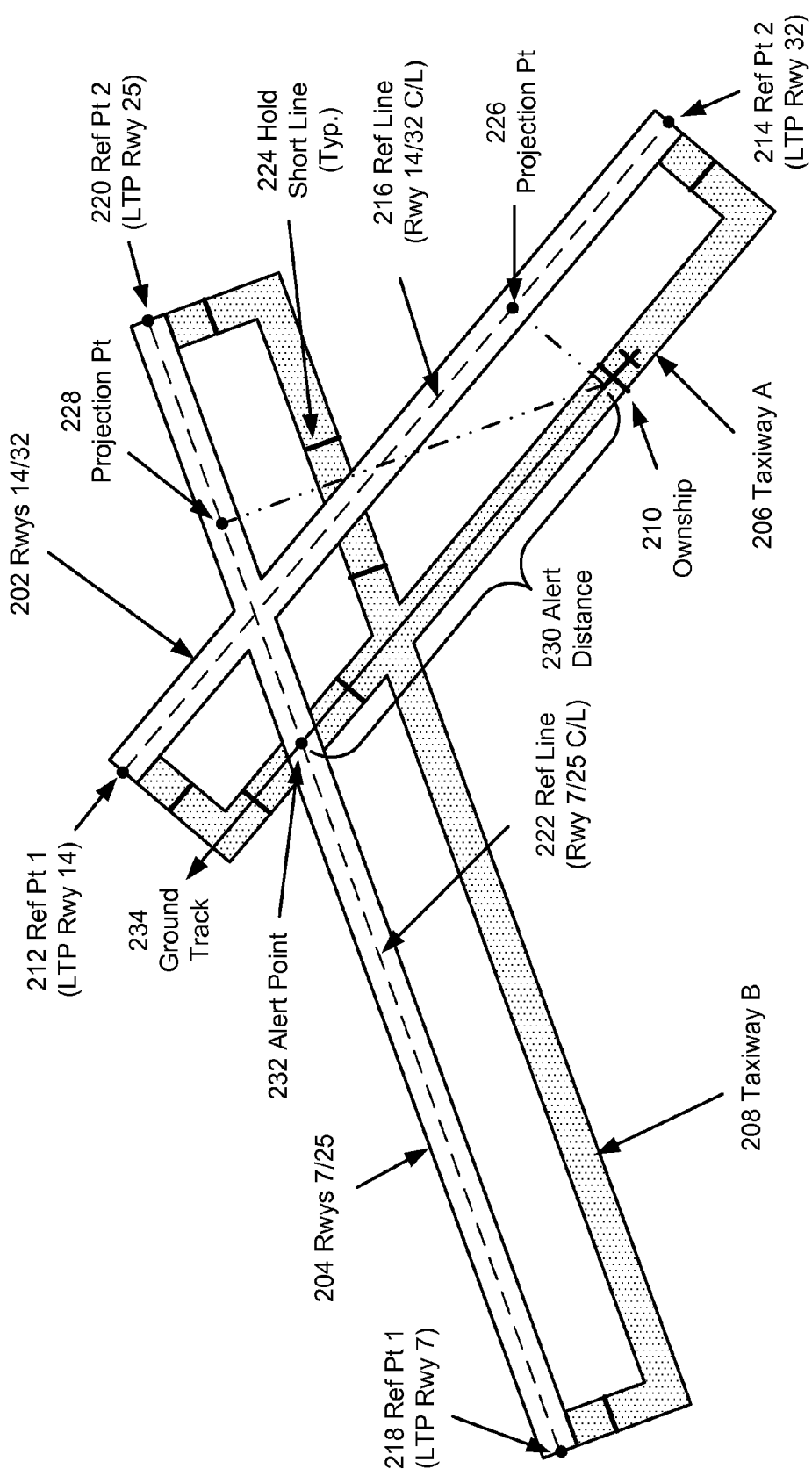
FIG. 2A provides an illustration depicting variables used in determining an alert distance along a ground track line based upon landing threshold points ("LTPs") used in the construction of a reference line that coincides with a runway centerline.

The SAG 130 may retrieve a set of data representative of two or more surface reference points established for an airport surface such as, for example, an LTP for a runway or taxi holding lines established on a taxiway. The retrieval of surface reference point data may be based upon the ownship position data received from the navigation data source 110. In FIG. 2A, LTP data corresponding to each runway of a runway surface may be retrieved from the airport surface data source 120 and used in the construction of a reference line. For the surface of Runways 14/32, the LTP for Runway 14 has been retrieved for use as the first reference point 212, and the LTP for Runway 32 has been retrieved for use as the second reference point 214. Then, a reference line 216 may be constructed between the two points. Because the LTPs for a runway surface have been retrieved, the reference line 216 coincides with the runway centerline of Runways 14/32.

Similarly, for the surface of Runways 7/25, the LTP for Runway 7 has been retrieved for use as the first reference point 218, and the LIP for Runway 25 has been retrieved for use as the second reference point 220. Then, a reference line 222 may be constructed between the two points. In addition or as an alternative to the use of runway surface data, taxiway surface data may be used. As shown in FIG. 2A, taxiway surface data representative of eight taxiway hold short lines 224 have been retrieved and used as reference points, four located on Taxiway A and four located on Taxiway B.

After the reference lines have been constructed, a projection point located on each reference line may be determined, where the projection point corresponds to the point at which ownship 210 is closest to that particular reference line. Referring to FIG. 2A, projection point 226 is the shortest distance between ownship 210 and the reference line 216, and projection point 228 is the shortest distance between ownship 210 and the reference line 222. The shortest distance between ownship 210 and the reference lines 216 and 222 represents the length of a line between ownship and each reference line that is perpendicular to the reference line. That is, the line between ownship 210 and the projection point 226 is perpendicular to reference line 216, and the line between ownship 210 and the projection point 228 is perpendicular to the reference line 222.

To determine a projection point, the SAG 130 may construct a perpendicular line (i.e., a line perpendicular to a reference line) originating from ownship and extending in a direction that is 90 degrees from the direction of each reference line. Here, the direction of reference line 216 is either 140 degrees or 320 degrees. Because ownship is south of the reference line 216, a perpendicular line originating from ownship 210 may be drawn in the direction of 050 degrees, and the point where the perpendicular line intersects with the reference line 216 is the projection point 226. To find the projection point 228 on the reference line 222 that has a direction of 070 degrees and 250 degrees, a perpendicular line originating from ownship 210 may be drawn in the direction of 340 degrees, and the point where the perpendicular line intersects with reference line 222 is the projection point 228.

After the shortest distance to each reference line has been determined, an alert distance 230 between ownship 210 and an alert point 232 may be determined by the SAG 130 as a trigonometric function of each shortest distance and the ground track 234. In FIG. 2A, the alert distance 230 may be determined by dividing the distance between ownship 210 and the projection point 228 by the sine of the acute angle formed at the intersection of the reference line 222 and the ground track 234, where the navigation data source 110 could provide the ground track information or ownship position information from which the ground track 234 could be determined. Here, the distance between ownship 210 and the projection point 228 may be divided by the sine of 70 degrees (320 degrees less 250 degrees).

Then, an alert time—the time for ownship to reach the alert point 232—may be determined by dividing the alert distance 230 by the ground speed of ownship 210, where the navigation data source 110 could provide the ground speed information or ownship position information from which the ground speed could be determined. A manufacturer and/or end-user have the ability to configure one or more threshold alert times for any time(s) desired. For the purpose of illustration and not limitation, a threshold alert time of 10 seconds could be set for the generation of a caution alert, and a threshold alert time of 5 seconds could be set for the generation of a warning alert.

Where the direction of the reference line is the same as the ground track and the two do not converge towards each other, an alert point is not available, and the determination of an alert time would not be applicable because the alert distance to the alert point could not be determined. The SAG 130 may be programmed to ignore the determining of the alert distance if ownship is traveling in a direction parallel to or away from the reference line. Moreover, it may ignore the determining of the projection point of a reference line if the direction of the reference line is checked with the direction of the ground track prior to making such finding. In FIG. 2A, because the direction of the reference line 216 is the same as the ground track 234, no determination of the projection point is necessary.

As shown in FIG. 2A, the SAG 130 may retrieve a set of data representative of two or more surface reference points established for an airport surface. In FIG. 2A, LTP data corresponding to each runway of a runway surface was retrieved from the airport surface data source 120 and used as the basis for constructing a reference line. In fact, both LTPs were used as the first and second reference points of a reference line; however, it is not necessary that surface reference points retrieved from the airport surface data source 120 serve as the actual first and second reference points of a reference line.

Figure 2B:
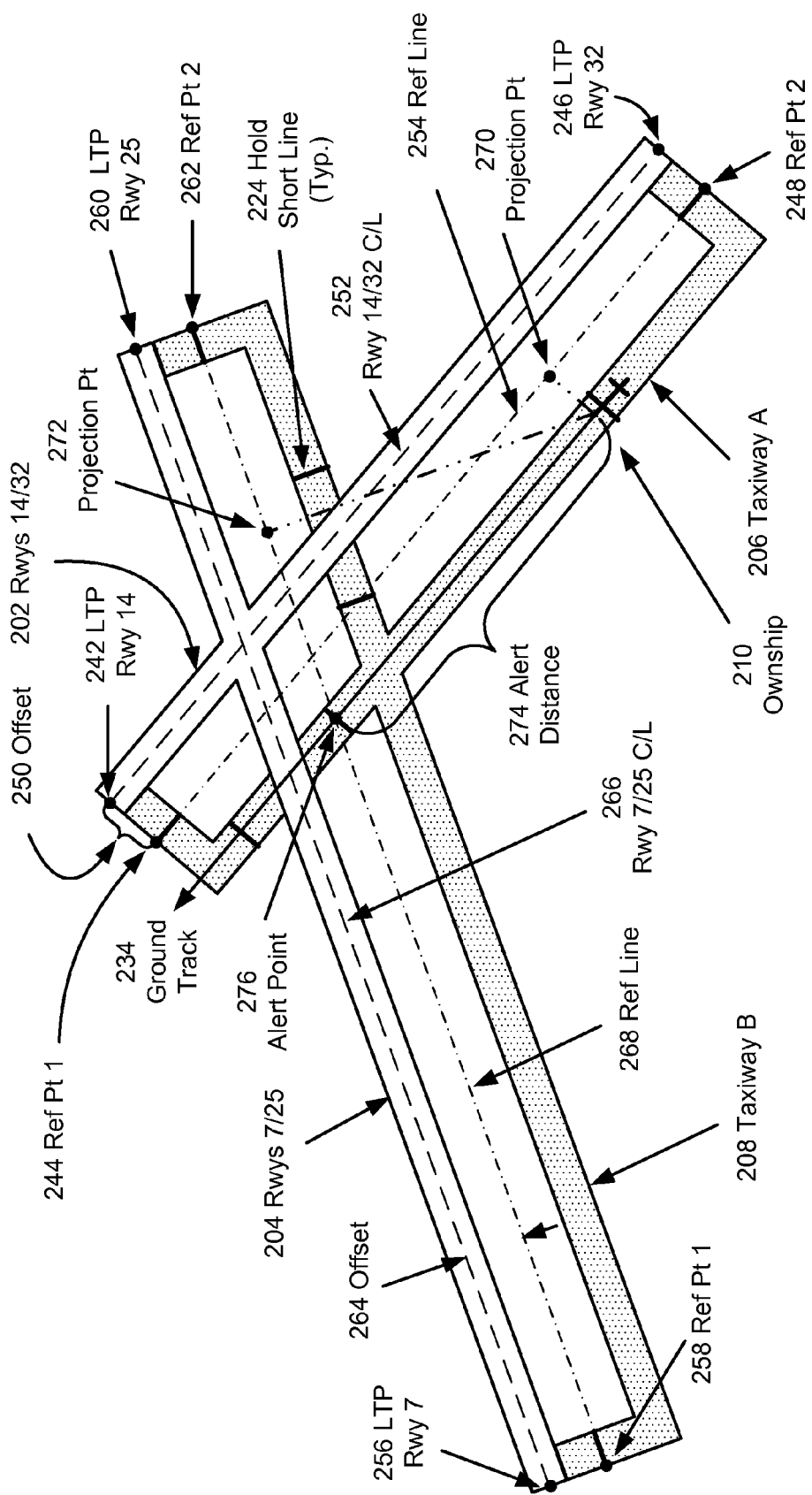
FIG. 2B provides an illustration depicting variables used in determining-alert distances along a ground track line based upon a reference line constructed from points of taxiway hold short line and/or points offset from the LTPs.

As shown in FIG. 2B, the LTP 242 for Runway 14 has been retrieved and used as a basis for determining the first reference point 244 for the surface of Runways 14/32, and the LTP 246 for Runway 32 has been retrieved and used as a basis for determining the second reference point 248. An offset 250 has been applied to the LTPs 242 and 246 in a direction that is perpendicular to the runway centerline 252 to determine the locations of the first and second reference points 244 and 248, respectively. After the first and second reference points 244 and 248 have been determined, a reference line 254 may be constructed between the two points.

Similarly, for the surface of Runways 7/25, the LTP 256 for Runway 7 has been retrieved and used as a basis for determining the first reference point 258, and the LIP 260 for Runway 25 has been retrieved for use as the second reference point 262. An offset 264 has been applied to the LTPs 256 and 260 in a direction that is perpendicular to the runway centerline 266 to determine the locations of the first and second reference points 258 and 262, respectively. Then, a reference line 268 may be constructed between the two points.

As embodied herein, the distance of the offset could be configurable by a manufacturer and/or end-user. For the purpose of illustration and not limitation, the offsets of FIG. 2B have been determined as a function of the distance between the runway centerline and one or more taxiway hold short lines 224, which such distance may be ascertainable from standards employed by an aviation-governing body that are known to those skilled in the art. It should be noted that, instead of using an offset based upon the LTPs 252 and 256, data representative of a plurality of reference points corresponding to a hold short line of a taxiway surface could have been retrieved from which the reference line may be constructed.

After the reference lines have been constructed, projection points 270 and 272 located on the reference lines 254 and 268, respectively, may be determined. Referring to FIG. 2B, the projection point 270 is the shortest distance between ownship 210 and the reference line 254, and projection point 272 is the shortest distance between ownship 210 and the reference line 268. After the shortest distance to each reference line has been determined, an alert distance 274 to an alert point 276 may be determined as a trigonometric function of the shortest distance and the ground track as discussed above. Then, the alert time may be determined as discussed above. Because an offset is used, a threshold alert time corresponding to a caution alert and/or a warning alert could be set to different times than those stated above. For example, a threshold alert time of 5 seconds could be set for the generation of a caution alert, and a threshold alert time of 0 seconds could be set for the generation of a warning alert.

It should be noted that, as discussed above, the determination of the point 270 is not necessary because the direction of the reference line 254 is the same as the ground track 234; that is, the reference line 254 is parallel to the ground track 234 or does not converge towards the ground track 234.

Figure 2C:
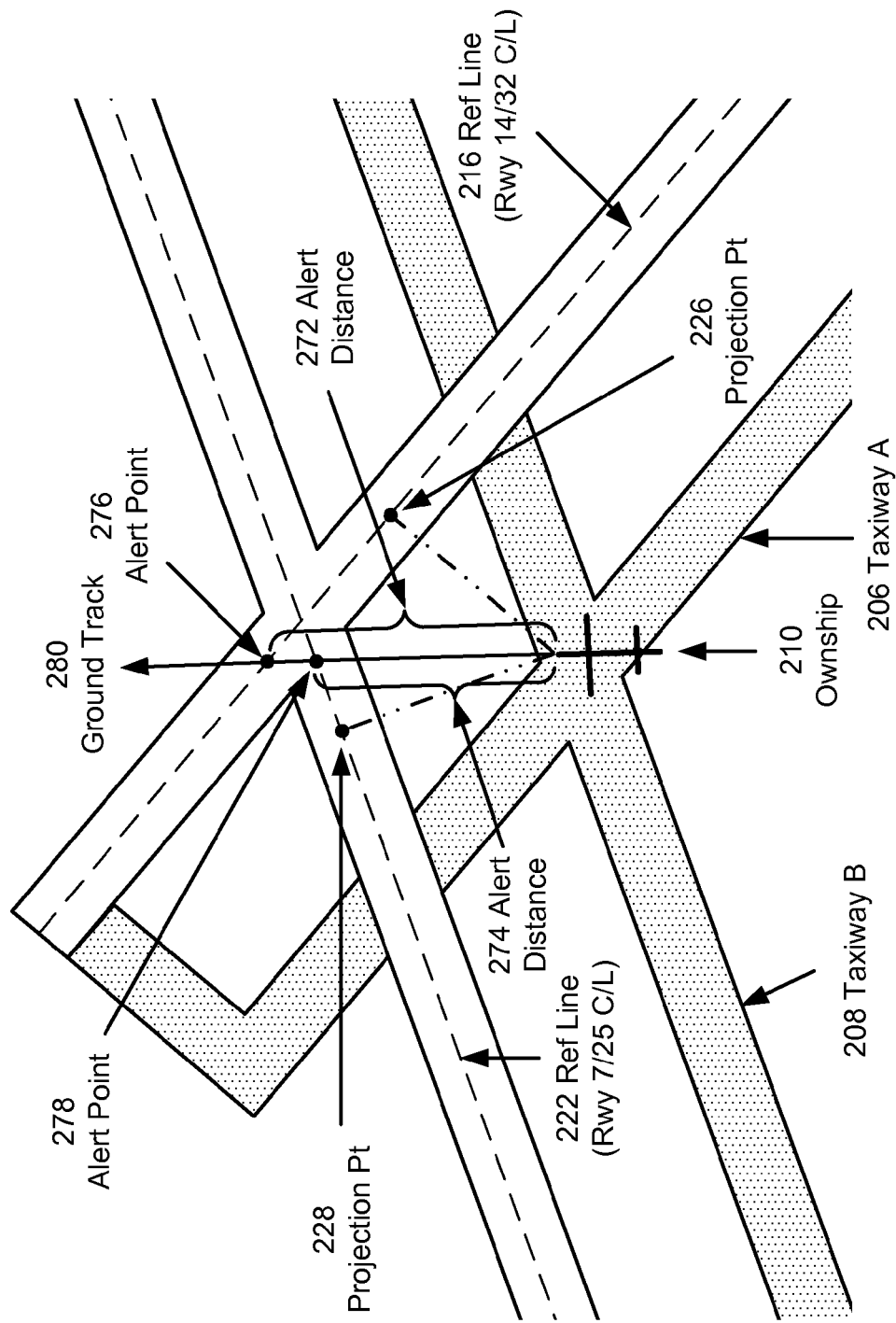
FIG. 2C provides an illustration depicting the variables used in determining two alert distances along a ground track line where two reference lines converge on a ground track line.
Figure 2D:
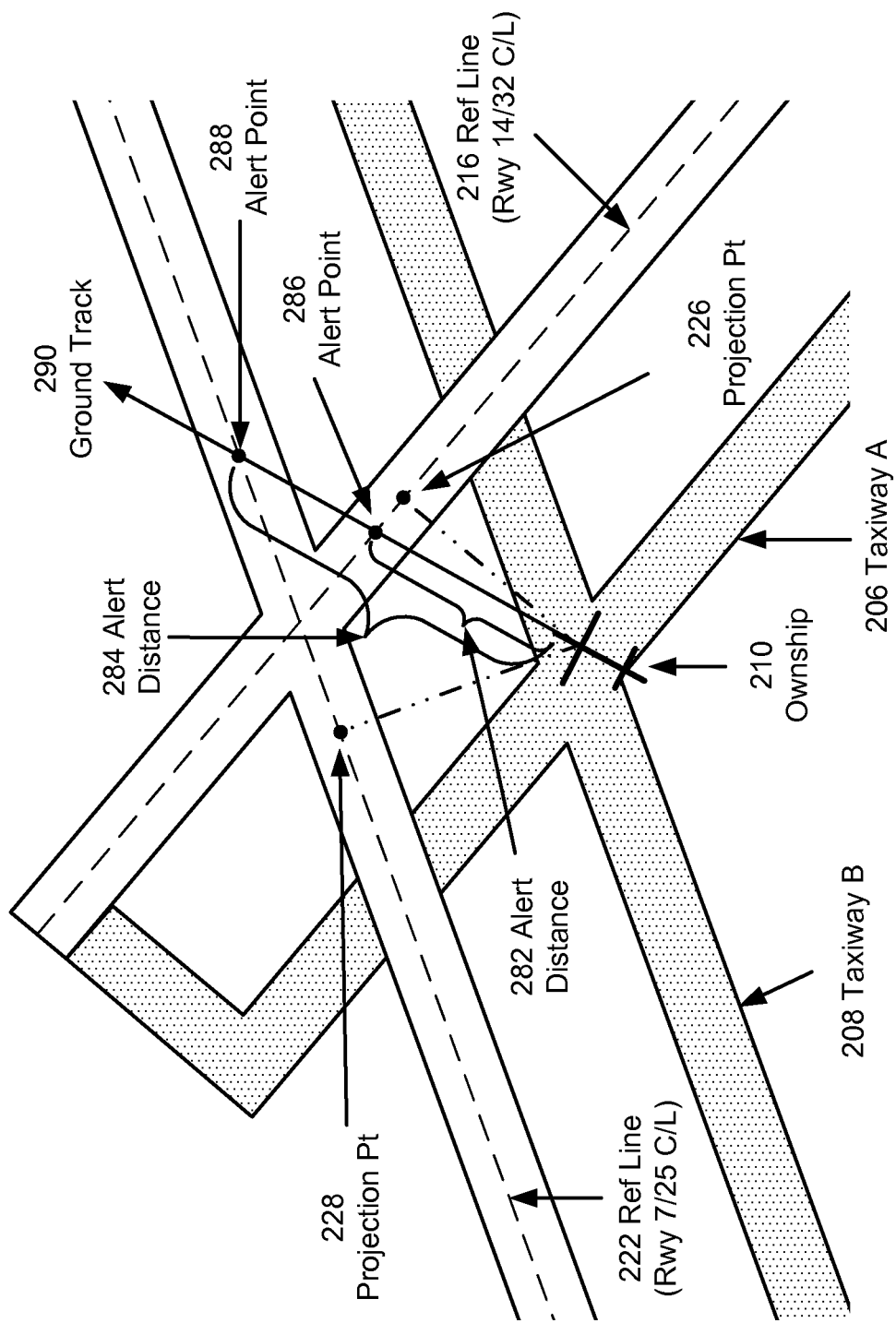
FIG. 2D provides a second illustration depicting the variables used in determining two alert distances along a ground track line where two reference lines converge on a ground track line.

In the drawings of FIGS. 2A and 2B, the direction of the reference lines 216 and 250 was the same as the ground track 234, and as such, the determination and/or use of the respective projection points 226 and 228 were not necessary; however, as shown in the drawings of FIGS. 2C and 2D, the determination and use of a plurality of projection points may be necessary to determine distances to two alert points when the directions of the reference lines is not the same as the ground track of ownship.

The drawings of FIGS. 2C and 2D provide an exploded view of the intersection of Taxiways A and B 206 and 208 and the reference lines 216 and 222 constructed in FIG. 2A. It is assumed that ownship 210 has taxied to the intersection and is turning onto Taxiway B 208 from Taxiway A 206. During its taxi, the position of ownship 210 has changed which causes changes to the locations of the projection points 226 and 228 as they slide along the reference lines 216 and 222, respectively.

As shown in FIG. 2C, ownship 210 is turning. While it turns, the ground track and the position of ownship is changing which causes more changes to the locations of the projection points 226 and 228 as they slide along the reference lines 216 and 222, respectively. As the position of ownship 210 changes, the measurement of the shortest distances between ownship 210 and the projection points 226 and 228 will continue to change. Once the shortest distance to each reference line has been determined, alert distances 272 and 274 to alert points 276 and 278, respectively, may be determined as a trigonometric function of the shortest distances and the ground track 280 (assumed to be 360 degrees in FIG. 2C).

In FIG. 2C, the alert distance 272 may be determined by dividing the distance between ownship 210 and the projection point 226 by the sine of the acute angle formed at the intersection of the reference line 216 and the ground track 280. Here, the distance between ownship 210 and the projection point 226 may be divided by the arcsine of 40 degrees (360 degrees less 320 degrees). Then, the alert time for ownship 210 to reach the alert point 276 may be determined by dividing the alert distance 272 by the ground speed of ownship 210.

Similarly, the alert distance 274 may be determined by dividing the distance between ownship 210 and the projection point 228 by the sine of the acute angle formed at the intersection of the reference line 222 and the ground track 280. Here, the distance between ownship 210 and the projection point 228 may be divided by the sine of 70 degrees (070 degrees less 360 degrees). Then, the alert time for ownship 210 to reach the alert point 278 may be determined by dividing the alert distance 274 by the ground speed of ownship 210. As shown in FIG. 2C, the alert time corresponding to the reference line 222 will be less the alert time corresponding to the reference line 216.

As shown in FIG. 2D, ownship 210 is continuing its turn from the turn shown in FIG. 2C. As ownship 210 continues its turn in FIG. 2D, the ground track and the position of ownship is changing which causes more changes to the locations of the projection points 226 and 228 as they slide along the reference lines 216 and 222, respectively. As the position of ownship 210 changes, the measurement of the shortest distances between ownship 210 and the projection points 226 and 228 will continue to change. After the shortest distance to each reference line has been determined, alert distances 282 and 284 to alert points 286 and 288, respectively, may be determined as a trigonometric function of each shortest distance and the ground track 290 (assumed to be 040 degrees in FIG. 2D).

In FIG. 2D, the alert distance 282 may be determined by dividing the distance between ownship 210 and the projection point 226 by the sine of the acute angle formed at the intersection of the reference line 216 and the ground track 290. Here, the distance between ownship 210 and the projection point 226 may be divided by the aresine of 80 degrees (040 degrees less 320 degrees). Then, the alert time for ownship 210 to reach the alert point 286 may be determined by dividing the alert distance 282 by the ground speed of ownship 210.

Similarly, the alert distance 284 may be determined by dividing the distance between ownship 210 and the projection point 228 by the sine of the acute angle formed at the intersection of the reference line 222 and the ground track 290. Here, the distance between ownship 210 and the projection point 228 may be divided by the arcsine of 30 degrees (070 degrees less 040 degrees). Then, the alert time for ownship 210 to reach the alert point 288 may be determined by dividing the alert distance 284 by the ground speed of ownship 210. As shown in FIG. 2C, the alert time corresponding to the reference line 216 will be less than the alert time corresponding to the reference line 222.

Figure 3:
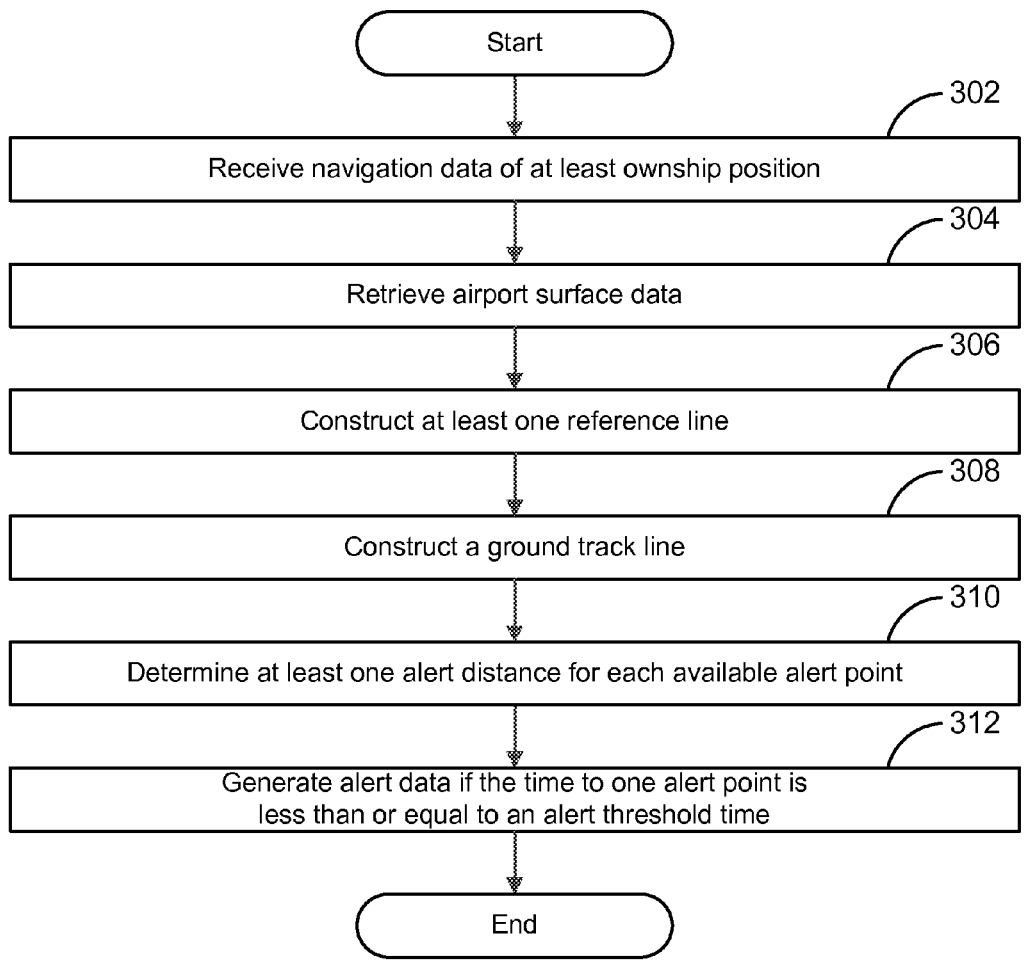
FIG. 3 depicts a flowchart of a method for generating a runway incursion alert.

FIG. 3 depicts a flowchart 300 of an example of a method for generating a runway incursion alert, where the SAG 140 may be programmed or configured with instructions corresponding to the following modules. As necessary for the accomplishment of the following modules embodied in FIG. 3, the receiving of data is synonymous and/or interchangeable with the retrieving of data. As stated above, data and signals are treated synonymously.

As shown in FIG. 3, the flowchart 300 is depicted. The flowchart begins with module 302 with the receiving of navigation data from the navigation data source 110. This data may be representative of the position of ownship from which ground track information and/or ground speed information may be determined by using changes of position when ownship moves. Alternatively, the navigation data could include data representative of ground track information and/or ground speed information.

The flowchart continues with module 304 with the retrieving of airport surface data from the airport surface data source 120 based upon ownship position. This airport surface data may be representative of one or more sets of reference points, where each set of reference points could correspond to an airport surface. As stated above, data representative of LTP locations and/or locations of points corresponding to holding position lines of airport surfaces such as, but not limited to, taxiway hold short lines for taxiway-to-taxiway and taxiway-to-runway intersections, ILS hold short lines, geographic position markings, and/or non-movement area boundary lines or markings may be retrieved from one or more airport surface data sources 120 such as an ARINC 424 database and/or an ARINC 816 database.

The flowchart continues with module 306 with the constructing of one or more reference lines, where each set of reference points could provide the basis for the construction. A set comprised of two reference points could be used as the endpoints for the reference line (e.g., runway centerline or taxiway hold short line) or one or more points through which a reference line passes through (e.g., an extended runway centerline or extended taxiway hold short line). Also, an offset could be applied to create a second set of reference points from the retrieved set of reference points. It should be noted that the use of an extended runway centerline or extended taxiway hold short line could be used as a reference line when a projection point is not located between the two reference points.

The flowchart continues with module 308 with the constructing of a ground track line based upon the navigation data. The ground track line could be representative of the ground track of ownship and extend from ownship in the direction of the ground track. As stated above, ground track information may be included in the navigation data or derived from the navigation data representative of ownship position.

The flowchart continues with module 310 with the determining of at least one alert distance along the ground track to an alert point; however, each alert distance may be determined for those reference lines that converge on the ground track line or are not parallel to the ground track line. As discussed above, the alert distance to each converging reference line may be determined by determining the shortest distance to the reference line from ownship and a trigonometric function (e.g., a sine function) of the angle (e.g., the acute angle) formed between the ground track and the reference line.

The flowchart continues with module 312 with the generating of surface alert data based upon an alert distance and the navigation data. The surface alert data could be generated when the alert time to one alert point is less than or equal to one or more alert threshold times. As stated above, ground speed information may be included in the navigation data or derived from the navigation data representative of ownship position. The surface alert data could be representative of a caution alert when the alert time is less than or equal to a caution alert threshold time and/or a warning alert when the alert time is less than or equal to a warning alert threshold time. The surface alert data could be representative of a caution alert when the alert time is less than or equal to a caution alert threshold time and/or a warning alert when the alert time is less than or equal to a warning alert threshold time.

After being generated, the surface alert data could be provided to the presentation system 140 configured to receive such data, where the surface alert data could be comprised of visual alert data, aural alert data, and/or tactile alert data. The visual alert data could be representative of a visual alert such as a visual warning alert and/or a visual caution alert that is presented on one or more display units 142. The aural alert data could be representative of an aural alert such as an aural warning alert and/or an aural caution alert that is presented through one or more aural alert units 144. The tactile alert data could be representative of a tactile alert that is presented through one or more tactile alert units 146. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating at least one incursion alert, such system comprising:
   a navigation data source;
   an airport surface data source; and
   a surface alert generator configured to
      receive navigation data representative of at least ownship position from the navigation data source,
      retrieve airport surface data from the airport surface data source based upon the navigation data, where
         the airport surface data retrieved is data representative of at least one set of reference points, where
            each set of reference points is comprised of two fixed reference points corresponding to one airport surface,
      construct one straight reference line for each set of reference points, where
         each set of reference points is employed for the construction of the one straight reference line,
      construct a ground track line based upon the navigation data, such that
         the ground track line intersects with at least one straight reference line in front of ownship converging on the ground track line,
      determine at least one alert distance between ownship and one alert point along the ground track line for each straight reference line converging on and intersecting with the ground track line, where
         each alert point is formed at the intersection of one converging, straight reference line and the ground track line, and
         each alert distance for each straight reference line is determined as a function of
            the shortest distance between ownship and the straight reference line, and
            a trigonometric function of an angle formed between the ground track line and the straight reference line, and
      generate surface alert data if the alert time to one alert point is less than or equal to at least one alert threshold time, where
         the alert time is based upon one alert distance and the navigation data.

2. The system of claim 1, wherein the plurality of reference points for at least one set of reference points corresponds to landing threshold points of a runway surface.

3. The system of claim 1, wherein the plurality of reference points for at least one set of reference points corresponds to a holding position line of an airport surface.

4. The system of claim 1, wherein at least straight reference line is constructed after an offset is applied to at least one set of reference points.

5. The system of claim 1, wherein
the surface alert data is representative of
  a caution alert if the alert time is less than or equal to a caution alert threshold time,
  a warning alert if the alert time is less than or equal to a warning alert threshold time, or
  both.

6. The system of claim 1, further comprising:
a presentation system configured to
  receive the surface alert data, where
    the surface alert generator has been further configured to provide the surface alert data to the presentation system, and
    present the surface alert represented in the surface alert data to a pilot, whereby
      such surface alert is presented visually on the screen of a display unit, aurally through an aural alert unit, tactilely through a tactile alert unit, or any combination thereof.

7. An apparatus for generating at least one incursion alert, such apparatus comprising:
a surface alert generator configured to
  receive navigation data representative of at least ownship position from the navigation data source,
  retrieve airport surface data from the airport surface data source based upon the navigation data, where
    the airport surface data retrieved is data representative of at least one set of reference points, where
      each set of reference points is comprised of two fixed reference points corresponding to one airport surface,
  construct one straight reference line for each set of reference points, where
    each set of reference points is employed for the construction of the one straight reference line,
  construct a ground track line based upon the navigation data, such that
    the ground track line intersects with at least one straight reference line in front of ownship converging on the ground track line,
  determine at least one alert distance between ownship and one alert point along the ground track line for each straight reference line converging on and intersecting with the ground track line, where
    each alert point is formed at the intersection of one converging, straight reference line and the ground track line, and
    each alert distance for each straight reference line is determined as a function of
      the shortest distance between ownship and the straight reference line, and
      a trigonometric function of an angle formed between the ground track line and the straight reference line, and
  generate surface alert data if the alert time to one alert point is less than or equal to at least one alert threshold time, where
    the alert time is based upon one alert distance and the navigation data.

8. The apparatus of claim 7, wherein the plurality of reference points for at least one set of reference points corresponds to landing threshold points of a runway surface.

9. The apparatus of claim 7, wherein the plurality of reference points for at least one set of reference points corresponds to a holding position line of an airport surface.

10. The apparatus of claim 7, wherein at least straight reference line is constructed after an offset is applied to at least one set of reference points.

11. The apparatus of claim 7, wherein the surface alert data is representative of
  a caution alert if the alert time is less than or equal to a caution alert threshold time,
  a warning alert if the alert time is less than or equal to a warning alert threshold time, or both.

12. The apparatus of claim 7, wherein
the surface alert generator is further configured to
  provide the surface alert data to a presentation system, whereby
    the surface alert represented in the surface alert data is presented visually on the screen of a display unit, aurally through an aural alert unit, tactilely through a tactile alert unit, or any combination thereof.

13. A method for generating at least one incursion alert, such method comprising:
  receiving navigation data representative of at least ownship position from a navigation data source;
  retrieving airport surface data from an airport surface data source based upon the navigation data, where
    the airport surface data retrieved is data representative of at least one set of reference points, where
      each set of reference points is comprised of two fixed reference points corresponding to one airport surface;
  constructing one straight reference line for each set of reference points, where
    each set of reference points is employed for the construction of the one straight reference line;
  constructing a ground track line based upon the navigation data, such that
    the ground track line intersects with at least one straight reference line in front of ownship converging on the ground track line;
  determining at least one alert distance between ownship and one alert point along the ground track line for each straight reference line converging on and intersecting with the ground track line, where
    each alert point is formed at the intersection of one converging, straight reference line and the ground track line, and
    each alert distance for each straight reference line is determined as a function of
      the shortest distance between ownship and the straight reference line, and
      a trigonometric function of an angle formed between the ground track line and the straight reference line; and
  generating surface alert data if the alert time to one alert point is less than or equal to at least one alert threshold time, where
    the alert time is based upon one alert distance and the navigation data.

14. The method of claim 13, wherein the plurality of reference points for at least one set of reference points corresponds to landing threshold points of a runway surface.

15. The method of claim 14, wherein the plurality of reference points for at least one set of reference points corresponds to a holding position line of an airport surface.

16. The method of claim 14, wherein at least straight reference line is constructed after an offset is applied to at least one set of reference points.

17. The method of claim 14, wherein the surface alert data is representative of a caution alert if the alert time is less than or equal to a caution alert threshold time,
a warning alert if the alert time is less than or equal to a warning alert threshold time, or both.

18. The method of claim 14, further comprising:
providing the surface alert data to a presentation system, whereby
the surface alert represented in the surface alert data is presented visually on the screen of a display unit, aurally through an aural alert unit, tactilely through a tactile alert unit, or any combination thereof.

\* \* \* \* \*